United States Patent
Harrington

(10) Patent No.: US 6,721,063 B1
(45) Date of Patent: Apr. 13, 2004

(54) IMAGE RENDERING SYSTEM AND METHOD USING SUM AND DIFFERENCE ERROR DIFFUSION WITH ARBITRARY AND REDUNDANT COLORS

(75) Inventor: Steven J. Harrington, Webster, NY (US)

(73) Assignee: Xerox Corporation, Stamford, CT (US)

(*) Notice: Subject to any disclaimer, the term of this patent is extended or adjusted under 35 U.S.C. 154(b) by 0 days.

(21) Appl. No.: 09/487,543

(22) Filed: Jan. 19, 2000

(51) Int. Cl.[7] .......................... G06K 1/00; G06K 15/00; G06F 15/00
(52) U.S. Cl. ..................... 358/1.9; 358/3.03; 358/518; 358/534; 382/167; 382/252
(58) Field of Search ................................ 358/1.9, 3.03, 358/534, 518, 448, 535, 521, 465, 466; 382/162, 167, 252, 270, 271, 272, 273

(56) References Cited

U.S. PATENT DOCUMENTS

| 5,621,546 A | * | 4/1997 | Klassen et al. ............. 358/536 |
| 5,638,188 A | * | 6/1997 | Moro et al. ................. 358/3.03 |
| 5,949,965 A | * | 9/1999 | Gondek ........................ 358/1.9 |
| 6,014,233 A | | 1/2000 | Fan et al. .................... 358/515 |
| 6,068,361 A | * | 5/2000 | Mantell ........................ 347/15 |
| 6,072,591 A | * | 6/2000 | Harrington .................. 358/1.9 |
| 6,501,564 B1 | * | 12/2002 | Schramm et al. ............ 358/1.9 |
| 2003/0090728 A1 | * | 5/2003 | Schramm et al. .......... 358/3.04 |

* cited by examiner

Primary Examiner—Kimberly Williams
Assistant Examiner—Melanie Vida
(74) Attorney, Agent, or Firm—Oliff & Berridge, PLC

(57) ABSTRACT

An image rendering system and method use a sum-and-difference error diffusion technique that may be utilized in conjunction with image rendering using more than three colorants, e.g., inks. The colorants may be arbitrary and/or redundant. The sum-and-difference error diffusion technique involves two sets of steps. First, steps for performing specification of a colorant amount are separated from steps for determining colorant placement. Colorant placement is then performed by first summing the total number of colorant requests, including any associated error adjustments, and determining how many units of colorant will be rendered. Second, the adjusted colorant requests are sorted to fulfill the image rendering.

22 Claims, 5 Drawing Sheets

IMAGE RENDERING SYSTEM AND METHOD USING SUM AND DIFFERENCE ERROR DIFFUSION WITH ARBITRARY AND REDUNDANT COLORS

BACKGROUND OF THE INVENTION

1. Field of Invention

The invention relates to a system and method for controlling colors rendered by a printer or displayed on a monitor using more than three colors, excluding black, to reduce the visibility of error diffusion dot patterns with similar image quality as vector error diffusion, but with much less computation than using semi-vector quantization.

A portion of the disclosure of this patent document contains material that is subject to copyright protection. The copyright owners have no objection to the facsimile reproduction, by anyone, of the patent document or the patent disclosure, as it appears in the Patent and Trademark Office patent file or records, but otherwise reserves all copyright rights whatsoever.

2. Description of Related Art

Scalar error diffusion is a well known technique for reducing continuous tone images to a pattern of black and white spots for rendering using a binary device. A process for error diffusion is disclosed in an article entitled "An Adaptive Algorithm for Spatial Grayscale" by Robert W. Floyd and Louis Steinberg, Proceedings of the Society of Information Display, Vol. 17, pp. 75–77 (1976), hereby incorporated by reference in its entirety. That process uses an algorithm that analyzes whether to render a dot at a certain location within an image based on a comparison of the continuous tone data with a threshold value. Grayscale levels within the continuous tone image above a chosen threshold are assigned a dot to be rendered and those below the threshold are not assigned a dot to be rendered. If the threshold corresponds to midway between black and white, the method always chooses the closer of black and white. The inherent error resulting from such a choice is propagated in specified amounts to adjacent picture elements or pixels not yet analyzed to change the pixels prior to thresholding. This method produces a representation of a grayscale tone over a small area encompassing several dots that is more accurate than conventional halftoning. Hence, the error in the intensity of the digital image is diffused and, on average, zero.

The fraction of the error added to each neighboring pixel depends on a set of weights, the total error being multiplied by the weight corresponding to a given neighboring pixel and then added to the value of that neighbor pixel. The choice of weight can greatly affect the image quality, and much has been said about weights appropriate for giving pleasing results. Examples of weights other than those in the original Floyd and Steinberg algorithm may be found in papers by Jarvis, Judice, and Ninke, "A Survey of Techniques for Display of Continuous-Tone Pictures on Bilevel Displays", Computer Graphics and Image Processing, Vol. 5, pp. 13–40, (1976), Stucki, "Image Processing for Document Reproduction", Advances in Digital Image Processing, pp. 177–218, New York, Plenum, (1979), and Fan, "A Simple Modification of Error Diffusion Weights", Proceedings of the IS&T 46th Annual Conference, pp. 113–114, Boston (1993) and in U.S. Pat. No. 5,353,127 to Shiau et al., hereby incorporated by reference in their entireties.

In the case of color, however, one cannot just apply simple scalar error diffusion to each color component independently. To do so would produce noisy images. For example, a light blue can be produced by magenta and cyan pixels. But if the magenta and cyan are processed independently, then some pixels may have both magenta and cyan, yielding blue, while others have no color at all, giving white. This mixture of white, blue, magenta and cyan will have more contrast and look noisier than pixels of magenta and cyan alone. The process of independently processing each channel can result in any and all of the eight possible pixel colors distributed over an image area.

However, the problem of image noisiness can be reduced by a method of vector error diffusion. In vector error diffusion processing methods, the color chosen for each pixel is the color in a selected color space closest to the desired value, where the desired value is the input value adjusted by the errors diffused from neighboring pixels. This modification tends to confine the pixel colors to a subset near the input value and reduces noise. What is known as vector error diffusion was described in a paper by Venable et al., "Selection and Use of Small Color Sets for Pictorial Display", Proceedings of the IS&T Annual Meeting, Rochester (1990) and in a paper by Miller et al. "Color Halftoning Using Error Diffusion and a Human Visual System Model", Proceedings of the IS&T Annual Meeting, Rochester, (1990), hereby incorporated by reference in their entireties.

In vector error diffusion, colors are treated as points in a three-dimensional space, with the colors printable or displayable at given pixel discrete locations within that space. When a continuous tone color is to be displayed, the closest displayable or printable colorant is selected. The error, i.e., the difference between the input color and added error, and the output colorant, is calculated as a vector in color space. Here, the "closeness" might be the simple distance in color space or a weighted distance based on the human visual model. The vector is the difference between the desired, ideal, color and the available colorant. The error associated with that vector is then diffused in the same way as in scalar error diffusion.

There are, however, some problems with vector error diffusion. One such problem is the difficult three-dimensional computation required to find the closest colorant at each pixel. Second, the method is unstable for ideal colors that are near the boundary of the available color gamut provided by,an image rendering device. With these ideal color values, the addition of error adjustment from neighboring pixels can take a requested ideal color value out of the available color gamut. As a result, the nearest colorant to the requested color generates an error that leads even further outside the gamut. As a result, the vector error diffusion process collapses or produces unstable results. A third problem with some implementations of vector error diffusion is that processing may still not select the optimal set of colorants. For example, the vector error diffusion method may produce a gray from white and black pixels, where a smoother image might be produced if cyan, magenta and yellow were used because there would be less luminance contrast.

U.S. patent application Ser. No. 6,072,591, entitled "Sum and Difference Error Diffusion" filed by Steven J. Harrington on Jun. 30, 1997, assigned to the same assignee as the present invention and hereby incorporated by reference in its entirety, teaches a significantly different process for color error diffusion. Rather than applying vector or scalar error diffusion directly to the colors, this process minimizes errors by using the sum and differences of the colors. Using this method, error diffusion is only carried out on three channels with a simple decision tree selecting the output color at each pixel. However, that method for color error diffusion is not applicable when more than three colors other than black are used during color image rendering. Therefore, the process disclosed in U.S. patent application Ser. No. '691 is not applicable when there is more than one way to render a given requested color using various combinations of many colors. This is because the process was designed for use with a cmyk image rendering system.

Additionally, U.S. Pat. No. 6,014,233, entitled "Error Diffusion for Color Images with Semi-Vector Quantization", filed by Zhigang Fan and Steven J. Harrington on Jun. 9, 1998, assigned to the same assignee as the present invention and incorporated by reference in its entirety, teaches a method for color error diffusion that uses both sum and difference and scalar error diffusion. Sum and difference error diffusion is performed on the two darkest colors of the three colors used in a system to render color images. Scalar error diffusion is performed on the remaining, lightest color. By performing vector error diffusion for only the darker, more visually perceived colors, the image is rendered while minimizing perceived noise. However, because scalar error diffusion is performed for only the lighter, less visually perceived color, the increased amount of error associated with the scalar error diffusion is less perceptible. For example, semi-vector error diffusion would use sum and difference error diffusion for rendering magenta and cyan and scalar vector error diffusion for rendering yellow. Accordingly, relatively good image quality is provided while reducing the amount of computation performed during image rendering.

SUMMARY OF THE INVENTION

The exemplary embodiments of the invention provide an image rendering system and method using a sum-and-difference error diffusion technique that may be utilized in conjunction with image rendering using more than three colorants. The colorants may be arbitrary and/or redundant. The sum-and-difference error diffusion technique involves two sets of steps. First, the amount of colorant to be placed at a particular location is determined. Second, the specific colorants are selected that comprise the amount of colorant to be rendered. When determining the specific colorants to be used, the total number of colorant requests for a particular location are summed, including any associated error adjustments resulting from rendering colorant at locations other than the particular location. Subsequently, the colorant requests are sorted and selected to fulfill the color image rendering.

In a first exemplary embodiment, the adjusted colorant requests, i.e., colorant requests adjusted by errors resulting from colorant rendering at other locations, are sorted so that the largest requests are selected as part of the requested amount of colorant at the particular location.

In a second exemplary embodiment, additional rules beyond sorting the adjusted colorant requests based on size are utilized during sorting of the adjusted colorant requests. For example, the allowed colorant combinations are limited during the sort of the adjusted colorant requests. This is preferred when efficiency is desired; however, limiting the colorant combinations during the sort does not provide flexibility during image processing.

Alternatively, in a third exemplary embodiment, sorting the adjusted colorant requests is performed and completed and the results of that sort are used to index a look up table. This exemplary embodiment is preferable when there are more complicated rules implemented to provide greater system flexibility.

In a fourth exemplary embodiment, a weighting factor system is used to adjust the colorant requests and is integrated into the sorting process.

BRIEF DESCRIPTION OF THE DRAWINGS

The benefits of the present invention will be readily appreciated and understood from consideration of the following detailed description of the exemplary embodiments of this invention, when taken with the accompanying drawings, in which.

DETAILED DESCRIPTION OF PREFERRED EMBODIMENTS

One of the insights that allows use of the sum-and-difference method in conjunction with image rendering using many more colorants, i.e., more than four colorants including black, is that procedures such as vector error diffusion are actually carrying out two functions simultaneously. One function is to determine how much of each colorant to use while the second is to decide where to position the colorant in a medium. More specifically, in conjunction with image rendering by printing, how much of each color ink to use at a particular location is determined, while the second is to decide where to place the color ink in the rendered image.

Figure 1:
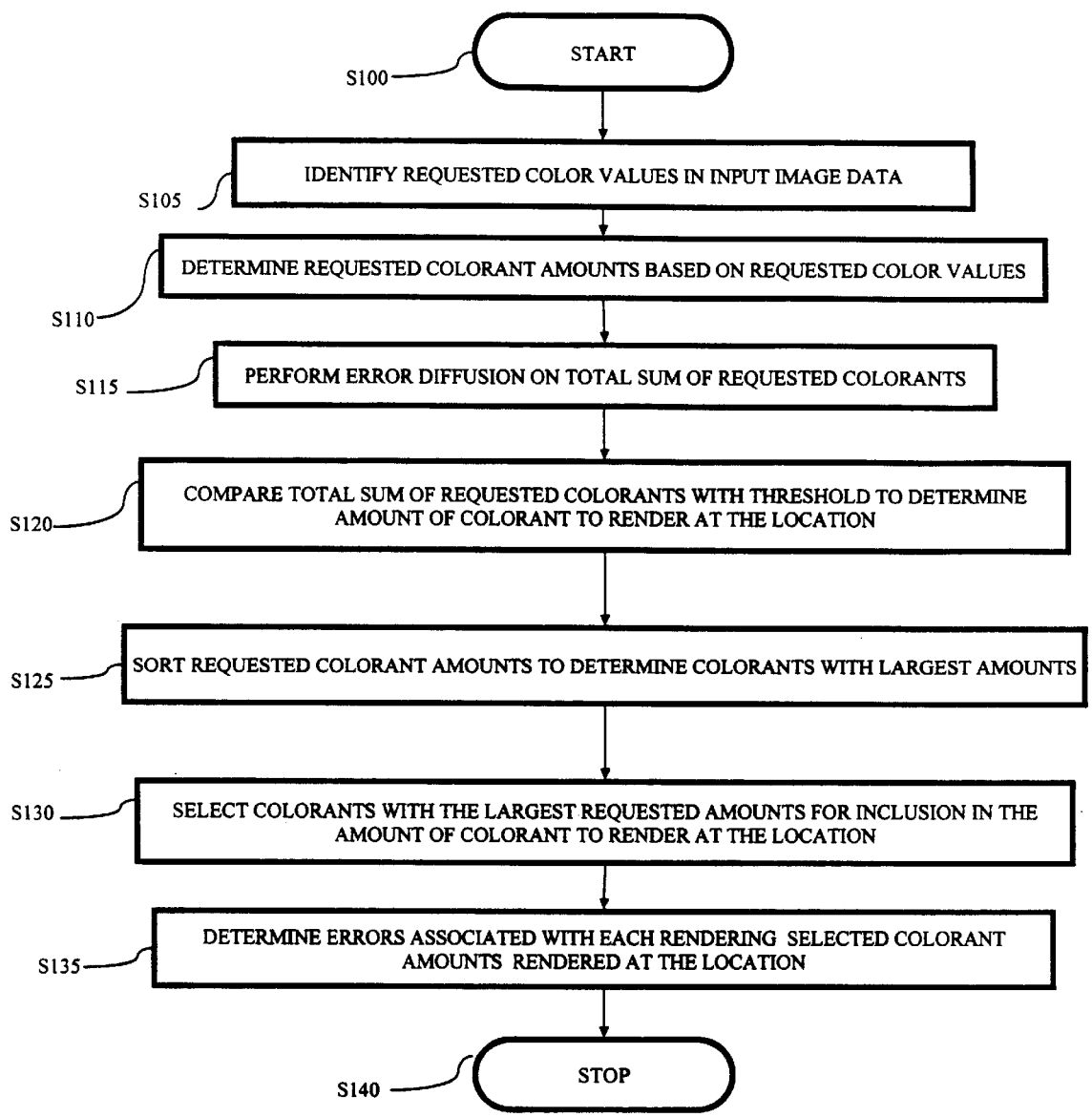
FIG. 1 illustrates a method of determining how much of each colorant to use in an image rendering system in accordance with a first exemplary embodiment of the invention.

FIG. 1 illustrates a method of determining how much of each colorant to use in an image rendering system using more than three colorants, excluding black, in accordance with the first exemplary embodiment of the invention. The method begins in step S100 and proceeds to step S105. In step S105, requested color values are identified within image data input to the image rendering system to render an image. Control then proceeds to step S110.

In step S110, the requested proportions of each colorant are determined from requested color values in input image data. In step S110, determining the requested proportions of colorant from the requested color values may be performed by mapping, e.g., using a three-dimensional look up table in which the color value is used as an index and requested colorant amounts are retrieved from the look up table. Such tables are well known but conventionally only provide three color values, or four color values including black. Examples are PostScript color rendering dictionaries and ICC color profiles. In such systems, interpolation is employed to provide values for colors that lie between the table entries, thereby allowing fewer entries and a smaller table size.

Although the requested color values included in input image data are converted into a specification of actual colorant amounts in step S110, there is still the problem of rendering arbitrary amounts of colorant. One might, for example, find that coverage by 50% cyan is specified. Typically, one can only render colorant or not render colorant at a particular location. More specifically, in printing, one can only print a full spot or not print a spot of ink. One cannot produce a 50% cyan spot, but rather either a 100% cyan or a 0% cyan spot. The solution is to print half of the spots at 100% and half at 0% to average to the desired 50%, but the art is in deciding which pixels get which ink amount.

In step S110, the necessary colorant ink amounts are summed:

$$s = \Sigma V_i$$

where the sum is performed over a range i; which spans over all the possible colorants available in a system and $V_i$ is the requested colorant amount i. As in the case of sum-and-difference error diffusion, s indicates the amount of colorant to be rendered, but not what the colorant is.

Control then proceeds to step S115, in which an error diffusion process is applied to necessary amount of colorant, s, or the individual colorant amounts that sum to give s, so that distributed errors, determined in subsequent method steps in the method of FIG. 1 from previously processed colorant rendering locations are added to s before it is used. The result of step S115 is an adjusted amount of colorant that takes into account the errors produced by rendering colorants at other locations. In the case of printing color images, these locations may be pixels. The adjusted colorant amount resulting the error distribution step, at a particular location, is s' and may be calculated as:

$$s' = s + e_s$$

or $$s' = \Sigma V_i + e_i$$

where $e_s$ is a total of previous errors distributed to the location being processed from rendering at other locations, $e_i$ is the distributed error for colorant i distributed to that location and s is the necessary amount of colorant to render the requested color value at the particular location. Control then proceeds to step S120.

In step S120, the adjusted, requested amount of colorant at the particular location, s', is compared to thresholds, determined based on image rendering media and device characteristics, to determine how much colorant is necessary to render at the particular location being processed. In the case of printing color images, this adjusted, requested amount of colorant corresponds to the amount of spots of ink to print.

As an example, assuming an ink amount $V_i$ ranging between 0 and 1, if the adjusted, requested amount of total colorant s' is less than 0.5, then no spots are printed. If s' is in the range 0.5 to 1.5, including 0.5, then one ink spot is printed. If s' is in the range including 1.5 to 2.5, spots from two inks are printed and so on up to the maximum number of inks that are allowed to print simultaneously. The limit of simultaneous printing can be less than the number of inks, but step S110 in which colorant amounts are determined must be consistent with this limit and never request a greater total amount of colorant.

Once it has been determined how much colorant to render in step S125, it is determined which colorants should comprise the rendered amount of colorant beginning in step S130. Step S130 sorts the adjusted, requested colorant amounts, i.e., $V_i + e_i$, the requested amounts adjusted by the distributed errors, by the amounts of the adjusted, requested colorants.

Control then proceeds to step, S130, in which the colorants having the largest amounts of adjusted, requested colorants are selected to be included in the colorant rendered at the particular location. The colorants are selected in order of amount, largest amount being first selected. The colorants are selected in the order in which they will be rendered at the location.

Control then proceeds to step S135, in which errors are determined for each colorant in the system and distributed so as to be used in step S115 for processing of other locations, e.g., neighboring pixels. Control then proceeds to step S140, in which the method ends. This method determines the colorant amounts for a single location and would typically be applied repeatedly until the colorant amounts for every location within an image have been determined.

The above-explanation of the first exemplary embodiment assumes that all colorants can be arbitrarily combined. However, this may not necessarily be the case. For example, rendering a non-black colorant along with a black colorant will merely provide the color black. Thus, any effect of the non-black colorant is lost. Therefore, simply rendering k number of colorants using a sum and sort method that focuses on the largest requested amounts may not be sufficient. One may need to consider further rules about which colorant combinations are allowed.

Figure 2:
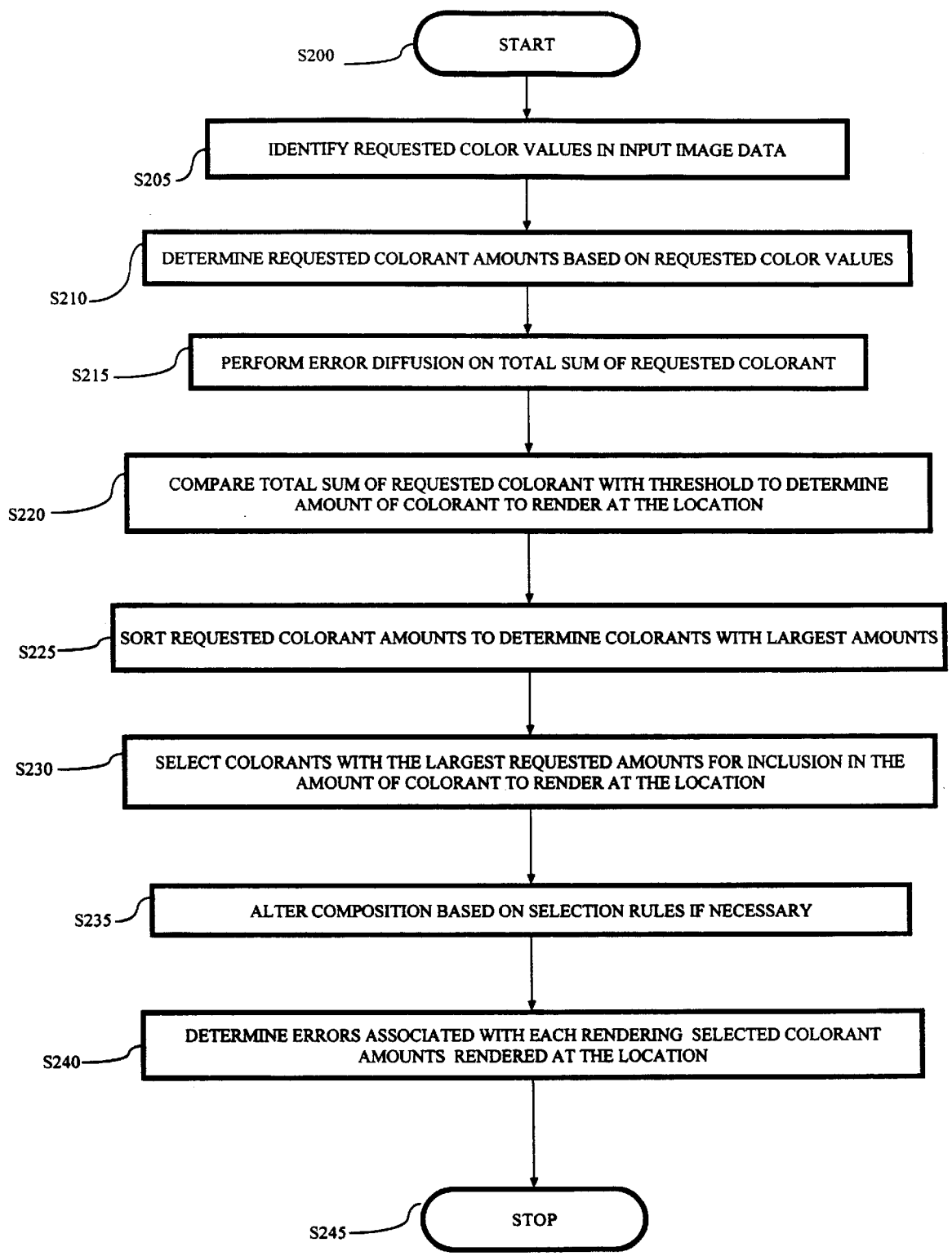
FIG. 2. illustrates a method of determining how much of each colorant to use in an image rendering system in accordance with a second exemplary embodiment of the invention.

Accordingly, the second exemplary embodiment of the invention, as illustrated in FIG. 2, is identical to the method steps illustrated in FIG. 1 but includes an additional step in which selection rules are referred to in the process. Specifically, the method steps from step S200 to step S230 are identical to that of steps S100 to S130. However, in the method according to the second exemplary embodiment, after step S230 control proceeds to step S235, in which the composition of the selected colorants is altered, if necessary based on selection rules.

Specifically, the number of units of colorant to render, e.g., number of ink spots to print, and the ordering of the colorants from the sort performed in step S225 and the selection performed in step S230 are used to form an index into a look-up table. This look up table provides the actual choices of colorant to render. In this way, if the colorant amount ordering indicates a forbidden combination, the look up table can provide an alternative choice. This approach can be used if the number of colorants and number of units to be rendered is small, e.g., so that the table size is not too big, and if the choice of colorants for rendering depends just on their amount order.

Subsequently, control proceeds to step S240, in which errors are determined for each colorant in the system and distributed so as to be used in step S215 for processing of other locations, e.g., neighboring pixels. Control then proceeds to step S245, in which the method ends.

Figure 3:
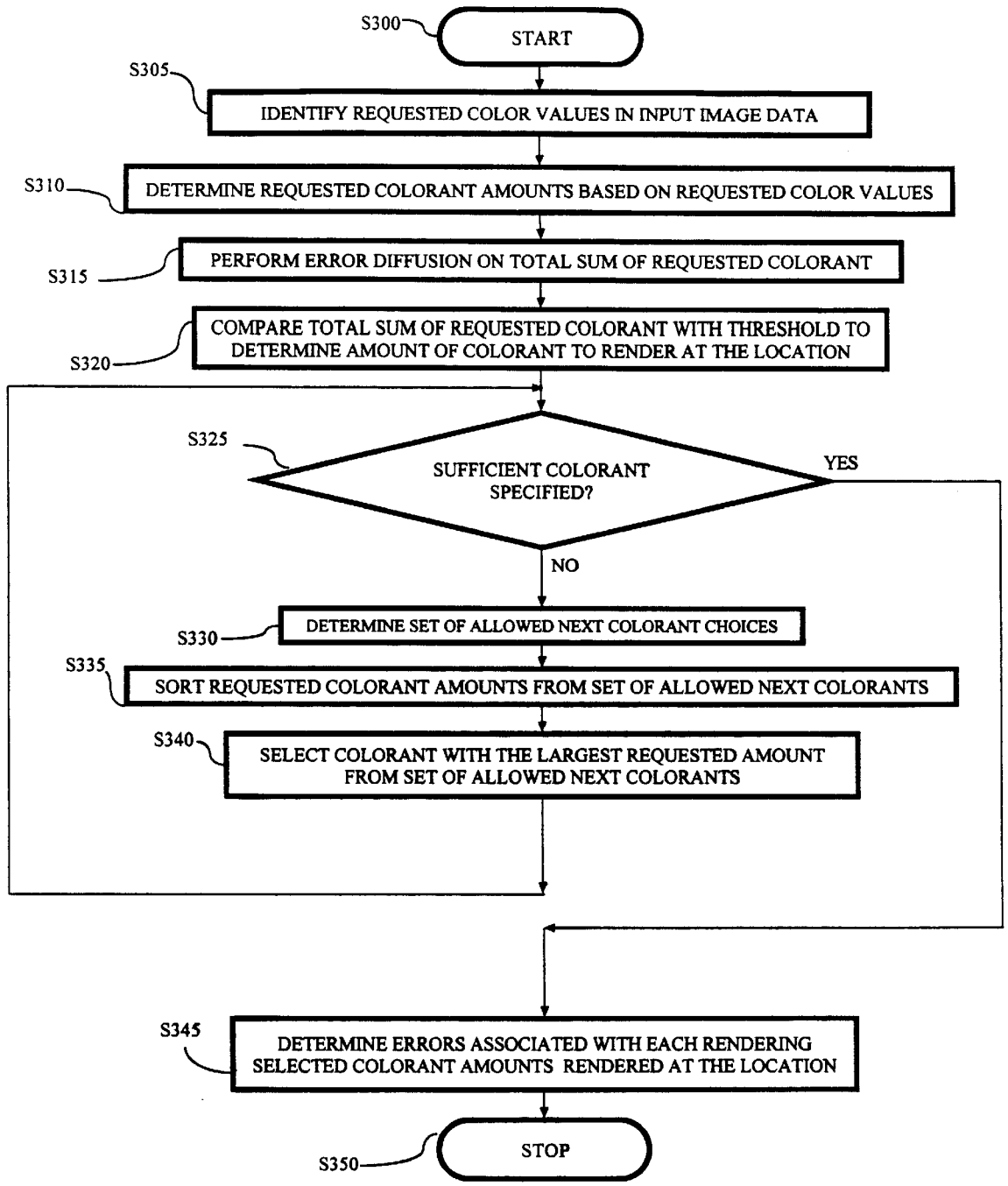
FIG. 3 illustrates a variation of the method according to the second exemplary embodiment in which the additional rules are integrated as part of the colorant sorting process.

An alternative, and perhaps preferable, approach is to more fully integrate the reference of additional rules into the sorting process as shown in FIG. 3. As illustrated in FIG. 3, the method is identical to the method steps illustrated in FIG. 1 to determine the amount of colorant to be rendered at the particular location; however, the steps associated with determining the constituent colorants to be rendered at the location are different. Specifically, the method steps from step S300 to step S320 are identical to that of steps S100 to S120.

However, in the method according to the variation of the second exemplary embodiment, after step S320 control proceeds to step S325, in which it is determined whether sufficient colorant has been specified. When the method steps S300 to S320 determine that no colorant is to be rendered at the location, control jumps from step S325 to step S345 to determine errors associated with the particular location. However, if steps S300 to S320 determine that some colorant is necessary, then control will proceed to step S330, in which a set of allowed next colorant choices is determined based on a set of selection rules that have been predetermined based on an understanding of which colorant can be combined and in what order. When step S330 is performed for the first time, there is no previously selected colorant upon which a determination of a next colorant is based. However, for second and subsequent colorant selections, step S330 is based on all previously selected colorants at the particular location. Determining the set of allowed next colorant choices can be performed using hardware logic that captures the additional sorting rules or by referring to a look-up table of allowed colorant choices. Control then proceeds to step S335, in which sorting is performed on the set of allowed next colorant choices to determine the largest quantity from among the set of allowed next colorant choices. Control then proceeds to step S340, in which the colorant with the largest requested amount is selected as part of the colorant to be rendered at the particular location and control returns to step S325. In step S325, it is determined whether additional colorant selections are necessary. If so, control proceeds through steps S330–S340 until the total quantity of necessary colorant to be rendered at the location is specified.

If no additional colorant selections are necessary, control proceeds to step S345, in which errors resulting from the colorant amounts and selections at the particular location are determined for each colorant in the system distributed so as to be used in step S315 for processing of other locations, e.g., neighboring pixels. Control then proceeds to step S350, in which the method ends.

It is important to note that the set of allowed second colorant choices is not necessarily coincident with the entire set of available colorant. This approach permits the use of more complex selection rules such as only allowing a colorant to be a possible choice if its desired amount exceeds some threshold.

Figure 4:
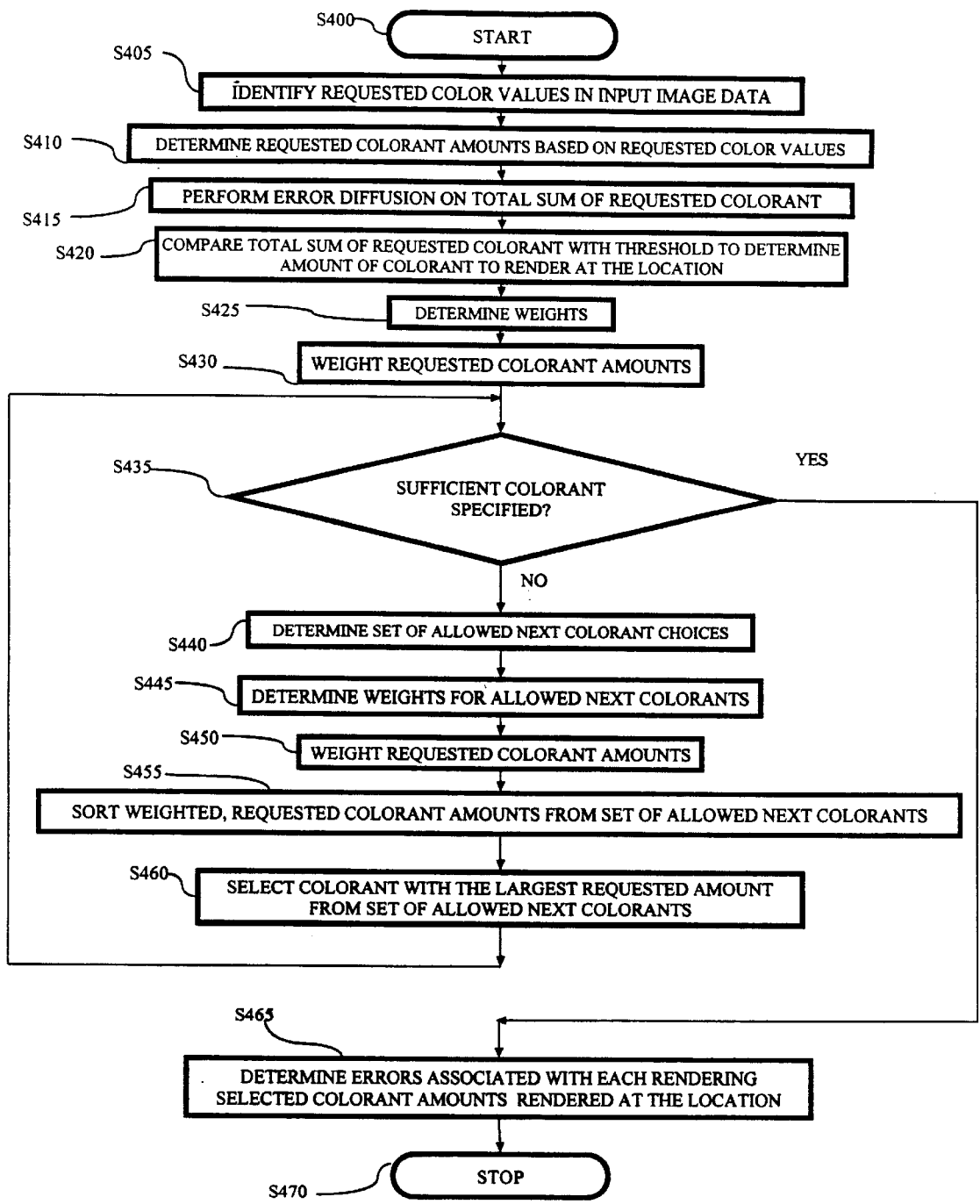
FIG. 4 illustrates a method of determining how much of each colorant to use in an image rendering system in accordance with a third exemplary embodiment of the invention.

A fourth exemplary embodiment of the invention utilizes a weighting factor system to avoid ineffective or aesthetically unpleasant colorant combinations. Each colorant amount determined in step S410 is multiplied by a weighting factor. Colorant combinations that generate a forbidden combination, e.g., black and a very light yellow, are ineffective because the very light yellow is obscured by the black. Therefore, the black can be assigned a weighting factor of zero to indicate the detriment of combining it with lighter colorants. Weighting combinations of colorants allows certain combinations to be favored over others. As illustrated in FIG. 4, the method is identical to the method steps illustrated in FIG. 1 to determine the amount of colorant to be rendered at the particular location; however, the steps associated with determining the constituent colorants to be rendered at the location are different. Specifically, the method steps from step S400 to step S420 are identical to that of steps S100 to S120.

In the method according to the fourth exemplary embodiment, after step S420, control proceeds to step S425, in which weights are determined for each of the requested colorants. Control then proceeds to step S430, in which weights are applied to the requested colorant amounts. Control then proceeds to step S435, in which it is determined whether sufficient colorant has been specified. When the method steps S400 to S420 determine that no colorant is to be rendered at the location, control jumps from step S435 to step S465 to determine errors associated with the particular location. However, if steps S400 to S420 determine that some colorant is necessary, then control will proceed to step S440, in which a set of allowed next colorant choices is determined based on a set of selection rules that have been predetermined based on an understanding of which colorant can be combined and in what order.

When step S440 is performed for the first time, there is no previously selected colorant upon which a determination of a next colorant is based. However, for second and subsequent colorant selections, step S440 is based on all previously selected colorants at the particular location. Determining the set of allowed next colorant choices can be performed using hardware logic that captures the additional sorting rules or by referring to a look-up table of allowed colorant choices. Control then proceeds to step S445, in which weights are determined for each of the requested colorants. Control then proceeds to step S450, in which weights are applied to the amounts of allowed next colorant choices. Control then proceeds to step S455, in which the weighted, requested colorant amounts are sorted and control proceeds to step S460. In step S460, in which colorants with the largest weighted requested amount from the weighted, requested colorant amounts are selected for inclusion in the amount of colorant to be rendered at the particular location. Control then returns to step S435. In step S435, it is determined whether additional colorant selections are necessary. If so, control proceeds through steps S440–S460 until the total quantity of necessary colorant to be rendered at the location is specified.

If no additional colorant selections are necessary, control proceeds to step S465. In step S465, errors resulting from the colorant amounts and selections at the particular location are determined for each colorant in the system. It is the adjusted requested colorant amounts (without any weighting) that are used in determining the errors. These errors are the types of errors distributed to neighboring image locations, e.g., pixels, in step S415. Control then proceeds to step S470, in which the method ends.

Figure 5:
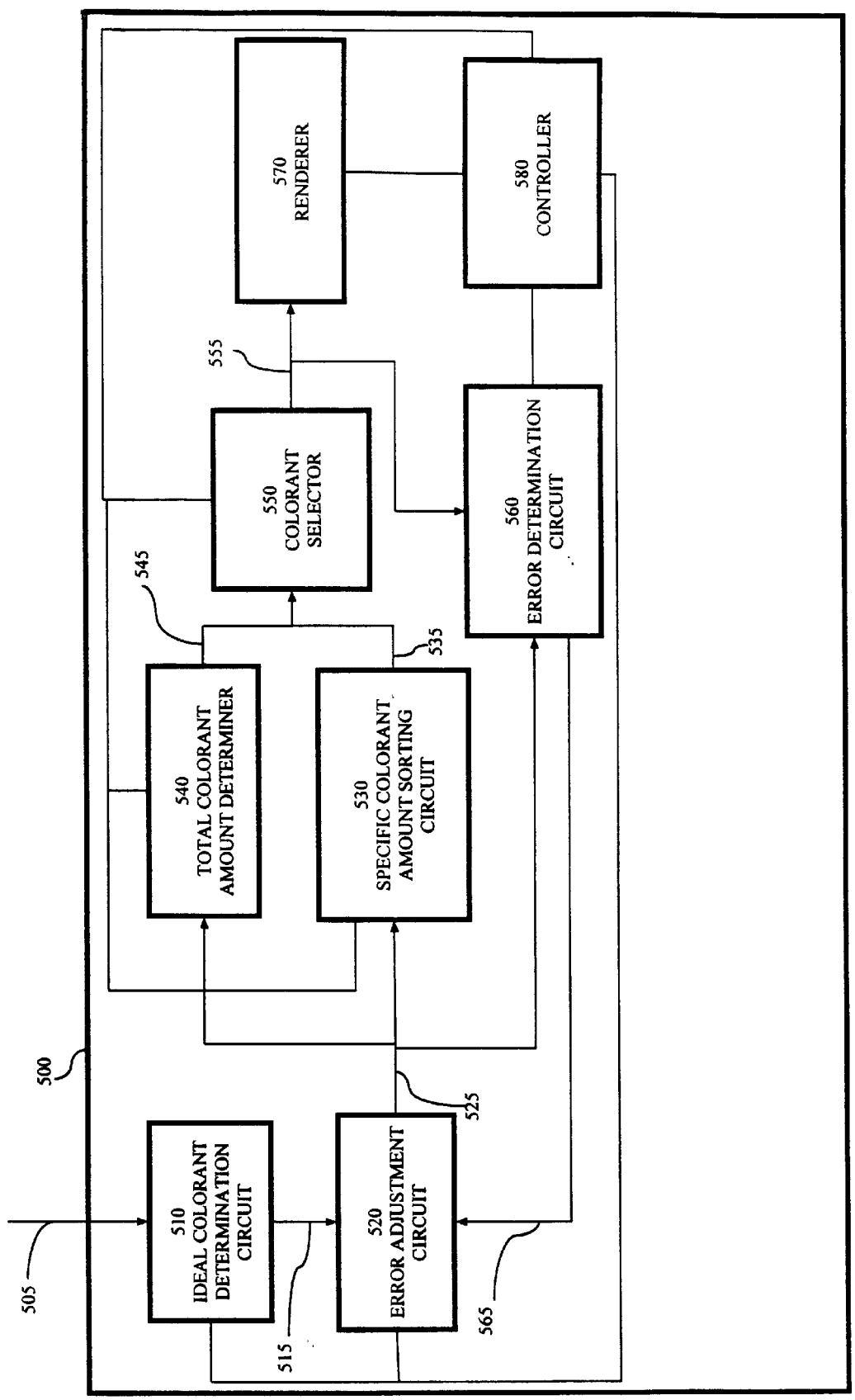
FIG. 5 illustrates an image rendering system in accordance with the exemplary embodiments of the invention.

FIG. 5 illustrates an image rendering system in accordance with the exemplary embodiments of the invention. As shown in FIG. 5, the image rendering system 500 includes an ideal colorant determination circuit 510, an error adjustment circuit, a specific colorant amount sorting circuit 530, a total colorant amount determiner 540, a colorant selector 550, an error determination circuit 560, an image renderer 570 and a controller 580. Controller 580 is coupled to all other elements 510–570 to control their operation. The error adjustment circuit 520 is also coupled to the ideal colorant determination circuit 510, the specific colorant amount sorting circuit 530, the total colorant amount determiner 540 and the error determination circuit 560. The colorant selector 550 is also coupled to the specific colorant amount sorting circuit 530, the total colorant amount determiner 540, the error determination circuit 560 and the image renderer 570.

Image data is provided to the image rendering system 500 via an image data path 505. This image data is input to the ideal color determination circuit that determines the color values identified by the image data. The ideal color determination circuit 510 determines ideal amounts of requested colorant corresponding to the requested color values. The ideal color determination circuit 510 outputs these requested colorant amounts to the error adjustment circuit 520 along image path 515. The error adjustment circuit 520 performs any necessary error diffusion to adjust the amounts of colorants to be rendered at a particular image location based on previously rendered colorants at other image locations.

The error adjustment circuit 520 outputs the adjusted amounts of requested colorants to both the specific colorant amount sorting circuit 530 and the total colorant amount determiner 540. The specific colorant amount sorting circuit 530 sorts the adjusted colorant amounts to identify the colorants with the largest adjusted colorant amounts. The total colorant amount determiner 540 determines the total colorant amount to determine how many units of colorant are to be rendered at the particular location. The specific colorant amount sorting circuit 530 and the total colorant amount determiner 540 each output the data they have determined to the colorant selector 550 along image data paths 535 and 545 respectively.

The colorant selector 550 selects the colorants to incorporate in the amount of colorant to be rendered at the particular location based on the data received from the specific colorant amount sorting circuit 530 and the total colorant amount determiner 540 in accordance with any of the four exemplary embodiments explained above. The specific colorant amount sorting circuit 530 and the total colorant amount determiner 540 operate simultaneously on the image input data corresponding to a particular location to simultaneously determine the amount of colorant to be rendered and the order for selecting constituent colorants within that amount. The data indicating which colorants have been selected and in what proportions are output to both the error determination circuit 560 and the image renderer 570 along image path 555.

The error determining circuit 560 determines the difference between the adjusted requested colorant amount which comes from the error adjustment circuit 520 and the amount actually instructed to be rendered by the renderer 570. The error determination circuit 560 uses the data to formulate errors to be used by the error adjustment circuit 520 to adjust colorant amounts for image locations analyzed subsequently. The image renderer 570 uses the data to render the image.

Although FIG. 5 indicates that the image renderer 570 is part of the image rendering system 500, it should be understood that illustrative examples of the image renderer 570 include a set of ink jet heads, an ROS system designed to produce color images, or any other now know or later developed equipment for physically rendering a color image. Additionally, it should be appreciated that the image rendering system 500 may be a printer, a copier, a display screen, digital copier, or any other type of now known or later developed device for rendering images. Alternatively, it is not necessary to render directly to a directly to a device for rendering or displaying an image. Therefore, it is foreseeable that the image renderer 570 may be replaced with another image data sink such as, for example, a file or memory buffer. Such a buffer could be coupled to an image renderer for rendering the image data stored in the buffer.

The image renderer 570 renders at least three colorants, not including black.

When operating in accordance with the first exemplary embodiment of the invention, the specific colorant amount sorting circuit 530 sorts the colorant requests so that colorant requests requesting a larger adjusted amount of colorant are selected before colorant requests requesting a smaller adjusted amount of colorant.

When operating in accordance with the second exemplary embodiment of the invention, the specific colorant amount sorting circuit 530 sorts the colorant requests so that colorant requests requesting a larger adjusted amount of colorant are selected before colorant requests requesting a smaller adjusted amount of colorant and colorant combinations of the selected colorant requests are limited.

When operating in accordance with the third exemplary embodiment of the invention, the specific colorant amount sorting circuit 530 sorts the colorant so that colorant requests requesting a larger adjusted amount of colorant are selected before colorant requests requesting a smaller adjusted amount of colorant and results of that sort are used to index a look up table of colorant combinations to be rendered. The look up table, not shown, may be stored within the specific colorant amount sorting circuit 530 or elsewhere in the image rendering system 500.

When operating in accordance with the fourth exemplary embodiment of the invention, the specific colorant amount sorting circuit 540 sorts the colorants so that colorant requests requesting a larger weighted adjusted amount of color are selected before colorant requests requesting a smaller weighted adjusted amount of color.

While this invention has been described in conjunction with the specific embodiments outlines above, it is evident that many alternatives, modifications and variations will be apparent to those skilled in the art. Accordingly, the preferred embodiments of the invention, as set forth above, are intended to be illustrative, not limiting. Various changes may be made without departing from the spirit and scope of the invention.

For example, image quality may be further improved by differentiating between darker colorants and lighter colorants when determining colorant positioning. More specifically, a more uniform appearance may be obtained by distributing dark colorants uniformly and then overlaying a distribution of the light colorants. Furthermore, information about dark colorant distribution may be used when determining the amount and position of light colorants using modulation of the error diffusion thresholds.

While employing the sum of the colorant amounts as described above results in a uniform distribution of colorant, it may not provide the optimum image quality. Colorants such as yellow are so much lighter than colorants such as magenta and cyan that they are not perceived as distinct dots. As a result, a more uniform appearance can be obtained by distributing the dark colorants, e.g., cyan, magenta and black, uniformly and then overlaying a distribution of the light colorants. It is conventionally known how the dark colorant distribution can provide input into the light colorant processing by modulation of the error diffusion thresholds.

These ideas can be generalized to the problem considered in this invention. Having determined the requested amounts for n colorants, the requests can be separated into amounts for the dark colorants and amounts for the light colorants. The set of dark colorants can be processed as described in connection with FIGS. 1–4, with the modification that each possible colorant combination that can be chosen for rendering should have an associated threshold modification amount, e.g., the difference between the requested amount of colorant and the rendered amount of colorant. The average of all threshold modification amounts should equal zero for all locations in the image.

The light colorant set can be processed as described above as well, with the exception that the thresholds used for determining the number of spots of light colorant to be rendered would be modulated by the amount associated with the dark colorant combination selected for rendering. Typically, the more dark colorants printed, the higher the threshold should be raised to decrease the likelihood of additional light colorant rendering. Similarly, the less dark colorant rendered, the lower the threshold, making more likely that the light colorant will be rendered. One example of a threshold modification amount that does this is some weighting factor multiplied by the difference between the number of units of colorant rendered and the desired colorant amount, that is, w(k-s), where w typically ranges between 0 and 1 units.

Additionally, the exemplary embodiments of the invention may utilize selection rules and weighting factors that provide for the replacement of cyan, magenta and yellow colorant rendered at the same location with black colorant.

What is claimed is:

1. An image rendering method using a sum-and-difference error diffusion technique, the method comprising:
    determining ideal colorant amounts at a first location;
    determining a total amount of colorant to be rendered at said first location;
    determining which colorants of a plurality of available colorants to include in the amount of colorant to be placed at the first location simultaneously with the step of determining the amount of colorant to be rendered at the first location,
    wherein the plurality of available colorants includes at least four colorants, not including black;
    determining a total number of colorant requests for the first location;
    adjusting an amount of colorant for each colorant by an error adjustment resulting from rendering colorants at locations other than the first location to provide an adjusted amount of colorant for each colorant at the first location;
    summing an amount of colorant for the total number of colorant requests to produce a total amount of colorant to be rendered at the first location; and
    sorting and selecting the colorant requests based on the adjusted amount of colorant for each colorant to fulfill the color image rendering at the first location;
    wherein the step of sorting and selecting is performed by sorting the colorant requests so that colorant requests requesting a larger adjusted amount of colorant are selected before colorant requests requesting a smaller adjusted amount of colorant and results of that sort are used to index a look up table of colorant combinations to be rendered.

2. The method of claim 1 wherein the method is utilized in an image rendering system that performs image rendering using more than three colorants.

3. The method of claim 1, wherein the step of sorting and selecting is performed by sorting the colorant requests so that colorant requests requesting a larger adjusted amount of colorant are selected before colorant requests requesting a smaller adjusted amount of colorant.

4. The method of claim 1, wherein the step of sorting and selecting is performed by sorting the colorant requests so that colorant requests requesting a larger adjusted amount of colorant are selected before colorant requests requesting a smaller adjusted amount of colorant and colorant combinations of the selected colorant requests are limited.

5. The method of claim 1, further comprising assigning a weighting factor to each available colorant and wherein the step of sorting and selecting is performed by sorting the colorant requests so that colorant requests requesting a larger adjusted amount of colorant are selected before colorant requests requesting a smaller adjusted amount of colorant and based on the colorant weighting factors.

6. The method of claim 1, wherein the step of determining an amount of colorant to be rendered at a first location comprises:
    determining the requested proportions of each colorant based on requested color values in input image data; and
    converting the requested color values included in the input image data into a specification of actual colorant amounts.

7. The method of claim 6, wherein determining the requested proportions of each colorant is performed using a three-dimensional look up table in which the color value is used as an index and requested colorant amounts are retrieved from the look up table.

8. An image rendering system using a sum-and-difference error diffusion technique, the system comprising:
    an ideal colorant determination circuit;
    an error adjustment circuit coupled to the ideal colorant determination circuit;
    a specific colorant amount sorting circuit and a total colorant amount determiner, both coupled to the error adjustment circuit;
    a colorant selector coupled to both the specific colorant amount sorting circuit and total colorant amount determiner;
    an error determination circuit coupled to the colorant selector and the error adjustment circuit; and
    an image data sink coupled to the colorant selector,
    wherein a plurality of renderable colorants includes at least three colorants, not including black;
    wherein the specific colorant amount sorting circuit sorts the adjusted colorant amounts to identify the colorants with the largest adjusted colorant amounts; and sorts the colorant so that colorant requests requesting a larger adjusted amount of colorant are selected before colorant requests requesting a smaller adjusted amount of colorant and results of that sort are used to index a look up table of colorant combinations to be rendered.

9. The image rendering system of claim 8, wherein image data is input to the ideal color determination circuit that determines color values to be rendered at a first location in an image identified by the image data.

10. The image rendering system of claim 9, wherein the ideal color determination circuit determines ideal amounts of requested colorant corresponding to the requested color values.

11. The image rendering system of claim 10, wherein the ideal color determination circuit outputs the ideal amounts of requested colorant to the error adjustment circuit that performs error diffusion to adjust the ideal amounts of requested colorants based on previously rendered colorants at locations other than the first location.

12. The image rendering system of claim 11, wherein the error adjustment circuit outputs adjusted amounts of requested colorants to both the specific colorant amount sorting circuit and the total colorant amount determiner.

13. The image rendering system of claim 12, wherein the specific colorant amount sorting circuit sorts the colorant requests so that colorant requests requesting a larger adjusted amount of colorant are selected before colorant requests requesting a smaller adjusted amount of colorant and colorant combinations of the selected colorant requests are limited.

14. The image rendering system of claim 12, wherein the total colorant amount determiner determines the total colorant amount to determine how many units of colorant are to be rendered at the first location.

15. The image rendering system of claim 12, wherein the specific colorant amount sorting circuit and the total colorant amount determiner each output data to the colorant selector and the colorant selector selects the colorants to incorporate in an amount of colorant to be rendered at the first location based on the data received from the specific colorant amount sorting circuit and the total colorant amount determiner.

16. The image rendering system of claim 15, wherein the specific colorant amount sorting circuit and the total colorant amount determiner operate simultaneously on image data corresponding to the first location to simultaneously determine the amount of colorant to be rendered at the first location and an order for selecting constituent colorants within that amount.

17. The image rendering system of claim 16, wherein data indicating which colorants have been selected and in what proportions are output from the colorant selector to both the error determination circuit and the image data sink.

18. The image rendering system of claim 17, wherein the error determining circuit determines a difference between the adjusted requested colorant amount and an amount actually instructed to be rendered at the first location.

19. The image rendering system of claim 18, wherein the error determination circuit uses the data indicating which colorants have been selected and in what proportions to formulate errors to be used by the error adjustment circuit to adjust colorant amounts for image locations other than the first location.

20. The image rendering system of claim 19, wherein the image sink is an image renderer that uses the data indicating which colorants have been selected and in what proportions to render the image at the first location.

21. The image rendering system of claim 8, wherein the image sink is from the group consisting of:

set of ink jet heads;

an ROS system designed to produce color images; and file or memory buffer.

22. The image rendering system of claim 8, wherein the system is part of a device selected from the group consisting of:

printer;

copier;

display screen; and digital copier.

* * * * *